United States Patent Office 3,330,959
Patented July 11, 1967

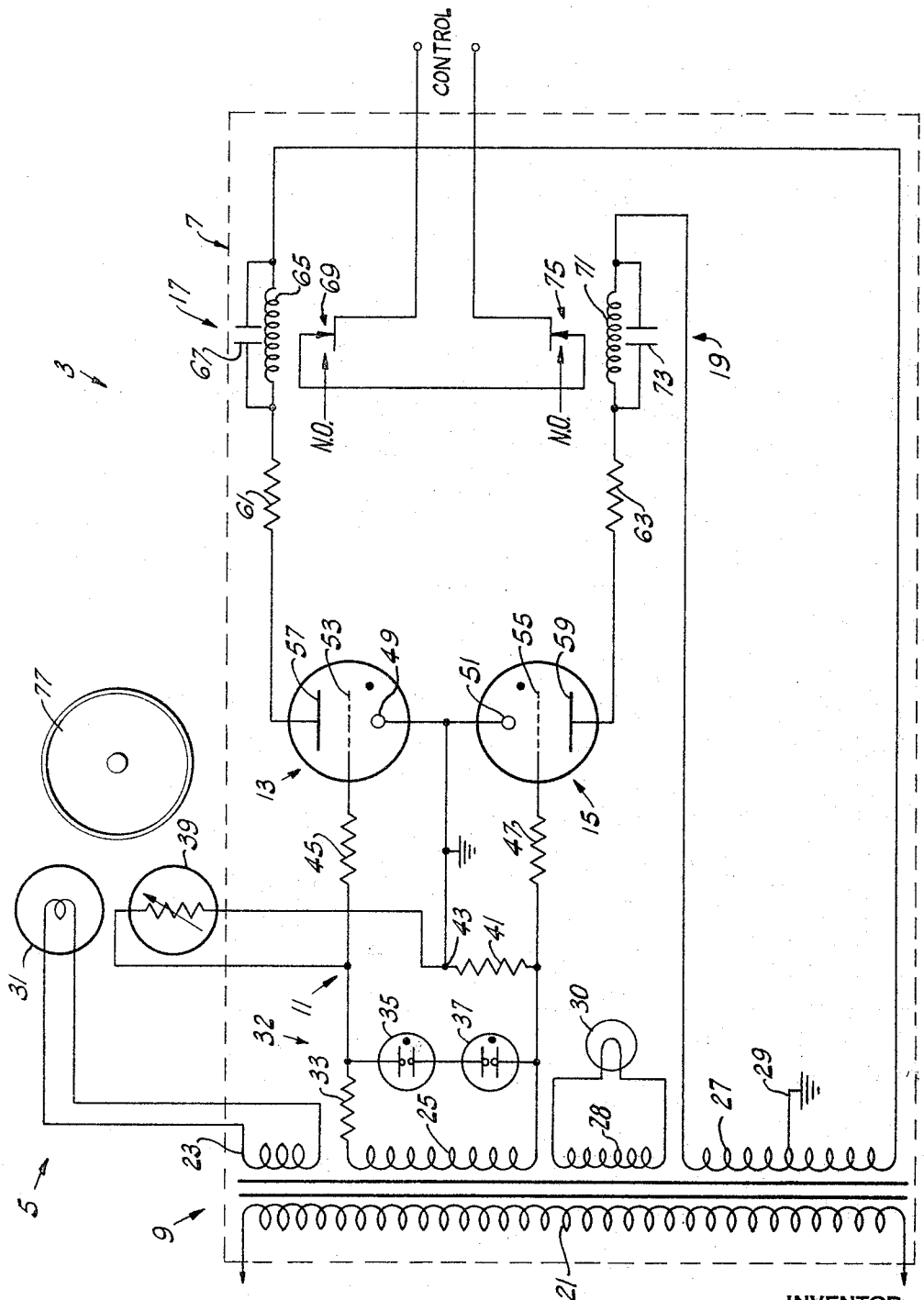

3,330,959
FAIL-SAFE REFLECTED LIGHT-RESPONSIVE
CONTROL CIRCUIT
Fred W. Willardson, Smethport, and Edward I. Zmuda, Emporium, Pa., assignors to Sylvania Electric Products Inc., a corporation of Delaware
Filed May 27, 1964, Ser. No. 370,563
5 Claims. (Cl. 250—214)

ABSTRACT OF THE DISCLOSURE

Control circuitry includes a device responsive to the magnitude of reflected light to cause development of a control signal. Also, normal operation of the circuitry is dependent upon normal functioning of the components and operation if the circuitry fails upon failure of a component.

This invention relates to a control circuit and more particularly to a "fail-safe" control circuit employing a device responsive to variations in illumination level.

Many types of apparatus and machinery are available for performing repetitive operations, and such equipment usually includes some type of control circuitry for the purpose of interrupting and stopping the equipment in the event that the operation becomes nonrepetitive or nonuniform. Moreover, much of the control circuitry in use today includes some type of photoconductive device responsive to variations in the amount of illumination focused thereon to provide a signal which can be used to stop or control the equipment.

However, it has been found that a great many of the available control circuits employing photoconductive devices are inadequately safe-guarded and for this reason leave much to be desired. For instance, many such circuits have little or no provisions therein which insure the discontinuance of the operation of the apparatus should one of the components in the circuitry fail to function. In other words, the apparatus which is supposedly controlled by the circuitry continues to operate even though the circuitry designed to protect and interrupt the operation is no longer functioning.

Therefore, it is an object of this invention to enhance the dependability of a control circuit having a photoconductive device therein.

Another object of the invention is to insure the functional operation of a control circuit during the operational period of the apparatus controlled.

A further object of the invention is to actively engage all of the components of a control circuit during the operational period of the apparatus being controlled and to discontinue the operation of the apparatus upon failure of one of the components in the control circuitry.

These and other objects are achieved in one aspect of the invention by a control circuit wherein virtually any failure in circuit components will activate the control features and interrupt the operation of the apparatus. Also, the control features of the circuit are responsive to the signal provided by a photoconductive device activated by variations in the level of illumination applied thereto.

For a better understanding of the present invention, together with other and further objects, advantages, and capabilities thereof, reference is made to the following disclosure and appended claims in connection with the accompanying drawing in which is shown a schematic illustration of one embodiment of the invention.

Generally, the circuitry includes a device responsive to the level of illumination reflected thereon from a surface whereon a light source is directed. This device is so designed that a shift in the level of reflected illumination causes a signal which activates a current responsive device and eventually the control circuitry necessary to discontinue the operation of the controlled apparatus. Also, the control circuitry is designed such that the failure of a component therein activates the circuitry and interrupts the operation of the apparatus.

Referring to the drawing, there is illustrated a control circuit 3 which includes a reflective lighting system 5 and a light-tight container 7 wherein is contained a transformer 9, a voltage divider 11, a pair of voltage responsive devices 13 and 15, and a pair of current responsive devices 17 and 19.

The lighting system 5 is external to the light-tight container 7 as will be explained hereinafter and the container 7 includes therein a transformer 9 having a primary winding 21 for connection to a source (not shown) of alternating potential and a plurality of secondary windings including a first winding 23, a second winding 25, and a third winding 27. This third winding 27 has a center tap 29 connected directly to circuit ground as is common in the art.

The first winding 23 provides a source of low potential such as, for instance, 6.3 volts wherefrom the illumination source 31 of the lighting system 5 is energized. This illumination source 31 bridges the winding 23 and may be any one of a number of light sources including an ordinary incandescent lamp.

The second winding 25 is bridged by a regulating means 32 which includes a series connected resistor 33 and a pair of neon tubes 35 and 37 which cooperate to provide a substantially uniform and regulated voltage across the tubes 35 and 37 even though the potential of the source (not shown) is subject to variations. The tubes 35 and 37 are shunted by a voltage divider 11 which includes a series connected light responsive device 39 and a resistor 41 having a tap 43 intermediate thereto directly connected to circuit ground.

Connected across the voltage divider 11 by way of a pair of current limiting resistors 45 and 47 is a pair of voltage responsive devices 13 and 15. Although numerous types of voltage responsive devices are applicable and appropriate, this particular embodiment is illustrated by a pair of cold cathode relay tubes 13 and 15 wherein each of the devices has a cathode 49 and 51, a starting anode 53 and 55, and an anode 57 and 59.

The cathodes 49 and 51 of each of the voltage devices 13 and 15 are directly connected to each other and to circuit ground. The potential across the voltage divider 11 is applied through the current limiting resistors 45 and 47 to the starting anodes 53 and 55 of the voltage devices 13 and 15. The anodes 57 and 59 are connected across the third winding 27 of the transformer 9 by way of a pair of series circuits which include a current limiting resistor 61 and current responsive device 17 and a second current limiting resistor 63 and second current responsive device 19. Further, the current responsive device 17 includes a coil 65 shunted by a capacitor 67 and a normally open (N.O.) contact 69 and, in a like manner, the device 19 includes a coil 71 shunted by a capacitor 73 and a normally open (N.O.) contact 75. The contacts 69 and 75 are series connected in the control circuit to insure that both contacts are closed when the control circuit is operational.

As to the normal operation of the circuit 3, an alternating potential applied to the primary winding 21 of the transformer 9 causes a potential at the secondary winding 23 which activates the illumination source 31 of the lighting system 5. Simultaneously, the potential at the second winding 25 is applied to the regulating means 32 wherefrom a substantially uniform potential is applied across the voltage divider 11. In the voltage divider 11, the light responsive device 39 receives the reflected illumination from the source 31 of the lighting system 5 and, under normal operating conditions, has a resistance substantially equal to the value of the fixed resistor 41. Thus, a substantially equal portion of the voltage across the divider 11 is applied to each of the starting anodes 53 and 55 of the voltage responsive devices 13 and 15.

At the same time, a substantially equal portion of the potential across the third winding 27 is applied to each of the anodes 57 and 59 of the voltage devices 13 and 15 and by way of the current responsive devices 17 and 19 and current limiting resistors 61 and 63. Thus, current flows through the current responsive devices 17 and 19 and causes the normally open contacts 69 and 75 to close thereby completing the circuit connected to the apparatus to be controlled.

However, should the amount of illumination reflected onto the light responsive device 39 suddenly increase, the resistance value thereof will decrease which will cause the voltage drop thereacross to decrease and the potential on the voltage responsive device 13 to drop below the conduction sustaining potential. Thus, current flow through the current responsive device 17 will cease causing the contact 69 to open and the apparatus to become inoperative. In a somewhat similar manner, a decrease in the reflected illumination because of a defect in the illumination source 31 or for any one of a number of reasons, causes the resistance of the light responsive device 39 to increase and the potential developed across the fixed resistor 41 to decrease. Thereupon, the voltage responsive device 15 ceases to operate which discontinues the current flow through the current responsive device 19 and causes the contact 75 to open discontinuing the operation of the apparatus.

In one specific embodiment of the invention, the transformer 9 has a primary winding 21 designed for the application of about 120 volts from an alternating potential source (not shown). Also, the transformer 9 has a plurality of secondary windings including a first winding 23 providing about 6.3 volts at 1.5 amperes thereacross, a second winding 25 having about 200 volts at 0.005 ampere, and a third winding 27 having about 250 volts at 0.015 ampere.

The first winding 23 is bridged by an ordinary incandescent lamp such as a type GE1314 which acts as the illumination source 31 and, in this instance, is directed onto a relatively dark drum-like surface such as the drum 77 of a duplicating machine.

The second winding 25 is bridged by a potential regulating means 32 which includes a series conected resistor 33 in the order of about ½ watt and 22K-ohms and a pair of neon tubes 35 and 37. The tubes 35 and 37 are of a type known as type NE2U and were selected because of their ready availability as well as their applicability to the other components in the circuit 3. Since the desired voltage is about 200 volts and such tubes have a firing voltage of about 100 volts and a sustaining voltage of 65 volts, a pair of tubes is required. Because an intrinsic characteristic of neon tubes is that the cathode material is photosensitive, the emissive level thereof is greatly reduced in the absence of illumination. Further, the firing or breakdown voltage of such tubes rapidly approaches the sustaining voltage when the tubes are exposed to a relatively high level of illumination for an extended period of time. Thus, it may be noted that the components of the circuit 3, with the exception of the lighting system 5, are enclosed in a light-tight container 7 in this particular application.

It is because of this absence of illumination that the type NE2U tubes were selected. It is well known that this tube type contains a radioactive additive which deters the deleterious effects of inadequate illumination and their inclusion within the light-tight container 7 along with the previously mentioned cold cathode relay tubes 13 and 15 provide a surrounding of sufficient stimulus for extended use. Additionally, should the stimulus provided by the relay tubes for the neon tubes 35 and 37 prove inadequate, a fourth winding 28 and a lamp 30 may be included within the light-tight container 7 to compensate for the insufficient illumination level.

The voltage divider 11 shunting the neon tubes 35 and 37 includes a photoconductor 39, such as the readily available type 8143 and a fixed resistor 41 which is in the order of 75K-ohms and ½ watt. The photoconductor 39 forms a part of the lighting system 5 located external to the light-tight container 7 and receives the reflected illumination from the previously mentioned dark drum 77 whereon the light source 31 is directed. This particular photoconductor has a resistance of about 75K-ohms so long as the drum 77 remains in a normal darkened condition and in conjunction with the resistor 41 equally divides the potential across the divider 11.

The voltage responsive devices 13 and 15 are a pair of type 5823 cold cathode relay tubes, which were selected because of their rapid response to a change in applied potential, and the current responsive devices 17 and 19 are a pair of relays with normally open contacts 69 and 75. These contacts 69 and 75 are series connected, and the coils 65 and 71 thereof are shunted by a capacitors 67 and 73 to prevent chatter as is common in the art.

In the operation of the circuit 3, the alternating potential from the source (not shown) may vary in the range of about 105 to 125 volts, and this potential is maintained at a substantially constant value of about 200 volts across the divider 11 by the regulating means 32. The photoconductor 39 and register 41 divide this potential which is equally applied to the cold cathode relay tubes 13 and 15, and, in conjunction with the potential applied thereto by the third winding 27, causes current to flow through the relays 17 and 19 and activate the control circuit.

However, if the amount of light reflected onto the photoconductive device 39 should suddenly increase because, for instance, of a piece of white paper sticking to the normally darkened drum 77, the resistance of the photoconductor will decrease to a value of about 10K-ohms causing the voltage applied to the relay tube 13 to drop and current conduction therethrough to cease, the relay 17 also to cease functioning, the contact 69 to open, and the operation of the apparatus controlled thereby to be interrupted. As previously mentioned, an increase in resistance of the photoconductor 39 operates in a similar manner to inactivate the relay tube 15, the relay 17, the contact 75, and the apparatus controlled thereby.

As to the "fail-safe" features of the circuit 3, it can be readily seen that both of the normally open relays 17 and 19 must be activated in order for the circuit 3 to function. Thus, a failure of the potential source or any of the windings 21, 23, 25, and 27 will interrupt the operation. Further, a failure of the light source 31 will increase the resistance of the photoconductor 39 and discontinue the operation.

An increase or decrease in resitsance or failure of the components of the voltage divider 11 will inactivate the circuit 3 as will a failure of either of the voltage responsive devices 13 and 15. Also, a failure of either of the current responsive devices 17 and 19 because of poor contacts 69 and 75 or failure of the coils 65 and 71 will inactivate the apparatus. Moreover, if the capacitors 67 and 73 should become open circuited, which is highly unlikely in electrolytic capacitors, the relays 17 and 19 will chatter while a short-circuited capacitor will inactivate the circuit 3.

Thus, there has been provided a control circuit having numerous advantages and "fail-safe" features which are believed to be unobtainable in any similar device. This circuit assures the functioning of all of the components therein and provides a readily apparent dependability which is believed to be unavailable in any of the devices currently obtainable.

While there has been shown and described what is at present considered the preferred embodiment of the invention, it will be obvious to those skilled in the art

What is claimed is:
1. A control circuit comprising:
   a transformer having a plurality of secondary windings including a first, second, and third winding, said third winding having a center tap directly connected to circuit ground;
   an illumination source bridging said first winding;
   a pair of voltage responsive devices, each device having an anode electrode, a starting anode, and a cathode electrode, said cathode electrodes being directly connected to circuit ground;
   a pair of current responsive devices, each device having a normally open electrical contact and said contacts being series connected; and
   circuit means connecting each of said starting anodes to said second winding and each of said anode electrodes to said third winding by way of one of said current responsive devices, said means including a voltage divider shunting said second winding and having therein an illumination responsive device activated by the reflected light from said illumination source.

2. A control circuit comprising:
   a transformer having a plurality of secondary windings including a first, second, and third winding, said third winding having a center tap directly connected to circuit ground;
   an illumination source bridging said first winding;
   a pair of cold cathode relay tubes, each tube having an anode, a starting anode, and a cathode, said cathodes being directly connected to circuit ground;
   a pair of relays, each relay having a normally open electrical contact and a coil shunted by a capacitor, said contacts being series connected; and
   circuit means connecting each of said starting anodes to said second winding through a resistor and each of said anodes to said third winding through a series connected resistor and a coil of one of said relays, said means including a voltage divider shunting said second winding, said divider including a series connected resistor and a photoconductor and said photoconductor being responsive to the reflected light from said illumination source.

3. A control circuit comprising:
   a transformer having a plurality of secondary windings including a first, second, and third winding, said third winding having a center tap directly connected to circuit ground;
   an illumination source bridging said first winding, said source being directed onto a reflective surface;
   a pair of voltage responsive devices, each device having an anode electrode, a starting anode, and a cathode electrode, said cathode electrodes being directly connected to circuit ground;
   a pair of current responsive devices, each of said devices having a normally open electrical contact and said contacts being series connected; and
   circuit means including voltage regulating means shunting said second winding and connecting each of said starting anodes to said voltage regulating means through a resistor and each of said anodes to said third winding through one of said current responsive devices, said means including a voltage divider shunting at least a portion of said regulating means, said divider including a series connected resistor and a photoconductor and said photoconductor being responsive to the reflected light of said illumination source.

4. A control circuit comprising:
   a transformer having a plurality of secondary windings including a first, second, and third winding, said third winding having a center tap directly connected to circuit ground;
   an illumination source bridging said first winding, said source being directed onto a reflective surface;
   a pair of cold cathode relay tubes, each tube having an anode, a starting anode, and a cathode, said cathodes being directly connected to circuit ground;
   a voltage regulating means including a series connected resistor and a pair of neon tubes shunting said second winding, said regulating means and said pair of relay tubes being enclosed within a light-tight container;
   a pair of current responsive devices, each of said devices having a normally open electrical contact and said contacts being series connected; and
   circuit means connecting each of said starting anodes to said voltage regulating means through a resistor and each of said anodes to said third winding through a series connected resistor and one of said current responsive devices, said circuit means including a voltage divider shunting at least a portion of said voltage regulating means, said divider having therein a series connected resistor and a photoconductor and said photoconductor being responsive to the reflected light of said illumination source.

5. A control circuit comprising:
   a transformer having a plurality of secondary windings including a first, second, third, and fourth winding, said third winding having a center tap to circuit ground;
   an illumination source bridging said first winding, said source being directed onto a light reflective surface;
   a pair of cold cathode relay tubes, each tube having an anode, a starting anode, and a cathode, said cathodes being directly connected to circuit ground;
   a voltage regulating means including a series connected resistor and a pair of neon tubes shunting said second winding and a light source shunting said fourth winding, said regulating means and said pair of relay tubes being enclosed within a light-tight container;
   a pair of current responsive devices, each of said devices having a normally open electrical contact and said contacts being series connected; and
   circuit means connecting each of said starting anodes to said voltage regulating means through a resistor and each of said anodes to said third winding through a series connected resistor and one of said current responsive devices, said circuit means including a voltage divider shunting at least a portion of said voltage regulating means, said divider having therein a series connected resistor and a photoconductor and said photoconductor being responsive to the reflected light of said illumination source.

References Cited

UNITED STATES PATENTS

| | | | |
|---|---|---|---|
| 2,217,797 | 10/1940 | Donovan | 340—233 |
| 2,654,651 | 10/1953 | Black | 340—285 X |
| 2,687,499 | 8/1954 | Scothorn | 317—130 |
| 2,714,160 | 7/1955 | MacDougall | 317—130 X |
| 3,020,413 | 2/1962 | Hamelink | 250—214 |
| 3,025,506 | 3/1962 | McDonough | 317—130 |

RALPH G. NILSON, *Primary Examiner.*

M. A. LEAVITT, *Assistant Examiner.*